United States Patent [19]

van der Merwe

[11] Patent Number: 4,487,241
[45] Date of Patent: Dec. 11, 1984

[54] PUMPING AND TIRE DEFLATION WARNING SYSTEM

[76] Inventor: Izak F. van der Merwe, 402 Hillside Heights, Wessels Rd., Green Point, Cape Town, Cape Province, South Africa

[21] Appl. No.: 420,165

[22] Filed: Sep. 20, 1982

[30] Foreign Application Priority Data

Jan. 15, 1982 [ZA] South Africa ................... 82/0275

[51] Int. Cl.³ ................. B60C 29/00; B60C 23/02
[52] U.S. Cl. ................... 152/428; 137/233; 138/89.4; 152/427; 200/61.22; 340/58
[58] Field of Search ............ 152/427, 428, 429, 415; 141/94, 95, 96, 38; 307/118; 340/58; 200/61.25, 61.22; 138/89.1, 89.2, 89.3, 89.4; 137/233; 116/34 R

[56] References Cited

U.S. PATENT DOCUMENTS

| | | | |
|---|---|---|---|
| 1,785,614 | 12/1930 | Boyer | 116/34 A X |
| 1,972,770 | 9/1934 | Gillespie | 152/418 |
| 2,043,277 | 6/1936 | Woodberry | 116/34 R |
| 2,463,335 | 3/1949 | Warnshuis et al. | 200/61.25 |
| 2,710,391 | 6/1955 | Trinca | 340/58 |
| 3,037,554 | 6/1962 | Risse | 431/77 |
| 3,235,684 | 2/1966 | Jordan et al. | 116/34 R X |
| 3,651,455 | 3/1972 | Hurlbutt | 340/58 |
| 3,680,523 | 8/1972 | Gaskins | 116/34 R |
| 3,738,308 | 6/1973 | Barabino | 116/34 R |
| 3,832,681 | 8/1974 | Kaida et al. | 116/34 R X |
| 3,872,268 | 3/1975 | Hata | 116/34 R X |

FOREIGN PATENT DOCUMENTS

2031123 4/1980 United Kingdom ............... 152/427

Primary Examiner—William A. Powell
Assistant Examiner—Thomas Bokan
Attorney, Agent, or Firm—Ladas & Parry

[57] ABSTRACT

A system is disclosed for warning that the pressure in one tire of a pair of dual tires is more than a predetermined amount below the pressure in the other. The system comprises a device fitted to the valve stem of the outer tire and having a single air inlet and two air outlets connected one to each tire. Two pistons are subjected to tire pressures and themselves act on a lever. When the tire pressures differ, the forces on the lever are unbalanced, and the lever tilts. A trigger unit is mounted on the rim of the inner tire and linked to the lever by a stiff wire. When the wire is displaced, a spring loaded arm of the trigger unit is released. On the body of the vehicle there is a switch the operating member of which is struck by the spring loaded arm after that arm has been released. The switch is connected to a warning device in the vehicle cab.

10 Claims, 6 Drawing Figures

PUMPING AND TIRE DEFLATION WARNING SYSTEM

THIS INVENTION relates to a pumping and tire deflation warning system for dual tires.

BACKGROUND TO THE INVENTION

It is a fact that tires constitute a major expense item in the budget of any road fleet owner. A tire casing can only be utilised to its full extent if it can be retreaded a number of times. Tire casings with damaged side walls cannot be retreaded with any degree of safety and must be discarded. Running a vehicle with an under pressure tire results not only in excessive wear of the tire tread but, of even more importance, in damage to the side walls which renders the tire casing unsuitable for retreading.

Under pressure tires are also a safety hazard in that it is not unknown for a soft tire to overheat to a temperature such that it bursts into flames. Furthermore, an under pressure tire is incapable of carrying its share of the axle load. Thus the other tires on the vehicle, and particularly the other tires on the same axle, are overloaded and their life is reduced. This problem is particularly acute when the underpressure tire is one of the tires of a pair of dual tires. In such circumstances, the other tire of the pair carries the entire load with extremely detrimental effects on its life.

For all these reasons it has long been accepted that vehicles, particularly heavy duty vehicles, should be fitted with means for warning the driver that he has an under pressure tire. A multitude of different proposals have been made in the past to provide such warning means but, to the best of applicant's knowledge, very few of these became available on a commercial scale, and those which did appear to have been a failure. At this time no warning systems seem to be available commercially in the United States.

The reasons why the systems that have been proposed have failed are numerous. Many proposed devices are over complex and/or too delicate to operate for any length of time when subjected to the constant drumming and vibration of a vehicle wheel. In other cases, to fit the warning structure, the wheel had to be modified, for example, by being drilled or by having some components welded or otherwise secured thereto, and this appears to be generally unacceptable to the truck user. It must also be remembered that, if a wheel has to be changed, the unit must be capable of being removed and refitted by the driver at the roadside.

A major problem which has received attention in the past is that of transferring a signal indicating a low pressure condition from the rapidly rotating wheel to the driver. Sounds such as whistles, explosions and the noise of an element hitting the pavement, have all been proposed. Radio transmitters and receivers and sound emitters and transducers have also been proposed as possible means for transferring the signal from the wheel to the vehicle body for onward transmission to the driver.

An object of the present invention is to provide a low pressure warning system which is simple in construction and capable of withstanding the vibrations and shocks to which it is subjected in use.

Another object of the present invention is to provide a simple, effective and rugged means for transferring a signal indicative of low pressure from the wheel to the vehicle body for onward transmission to the driver.

Another object of the present invention is to provide a system for warning that a tire is under inflated, which device can be removed from the wheel and refitted without the use of tools.

A difficulty which is encountered with dual tires is that the air inflation valve of the inner tire is difficult to reach with the air line. A further object of the present invention is to provide a device for warning that a tire is at below pressure and which additionally permits the tires of a pair of dual tires to be inflated from a single inlet.

Circumstances can arise where one tire of a pair is leaking slowly and eventually reaches a pressure at which the warning device is activated. A still further object of the present invention is to provide a low pressure warning device in which, by a simple action, the pressure in the tires of a pair of dual tires can be equalised.

BRIEF DESCRIPTION OF THE INVENTION

According to the present invention there is provided a pumping and tire deflation warning system for a pair of dual wheels, the system comprising a device mounted on the wheels, the device including a body having an inlet for connection to an air line and two outlets respectively connected to the tires of the pair of wheels, an element within the body and subjected to opposing forces derived from the tire pressures, a trigger unit mounted on the rim of the inner wheel, the trigger unit including an arm which is normally held in an inoperative position, a mechanical link between said element and said trigger unit for releasing said arm to its operative position upon the tire pressures varying from one another by a predetermined amount, and switch means mounted on a fixed part of the vehicle and having an operating member positioned to be hit by said arm when it is in its operative position.

Preferably said structure comprises a pair of cylinders with a piston in each cylinder, each cylinder being connected to one of said tires, and a pivotally mounted lever constituting said element, said pistons bearing on said lever on opposite sides of its pivotal mounting.

In this form, a spring loaded latching mechanism can be provided for preventing motion of said lever about its pivotal mounting until the pressures vary from one another by a predetermined amount.

Said lever and said body can each have a recess therein, there being a spring in one of said recesses and a latch element part of which is in each of the recesses, the spring acting on the latch element and urging it into the other recess.

The latch can be a ball.

It is preferred that the lever be of T shape and be pivotally mounted where the cross bar and upright of the T intersect, said pistons bearing on the cross bar on the side thereof remote from said upright, and said recess of the lever being a bore in the end of the upright remote from the cross bar.

Said structure can further comprise a first one way valve between said inlet and one of said outlets and a second one way valve between said inlet and the other of said outlets, and means for simultaneously enabling said valves to be opened thereby to place said outlets in communication with one another.

In a specific form said trigger unit comprises a pivotally mounted lever to which said link is connected, said arm being held in place by said lever until the link is displaced upon movement of said element. Said trigger unit may comprise a body having a raised stop thereon, and said lever has a radiussed end, the gap between said radiussed end and the stop being less than the diameter of said arm whereby the arm can only move between the stop and the lever upon said link displacing the lever.

BRIEF DESCRIPTION OF THE DRAWINGS

For a better understanding of the present invention, and to show how the same may be carried into effect, reference will now be made, by way of example, to the accompanying drawings in which.

DESCRIPTION OF THE PREFERRED EMBODIMENT

Figure 1:
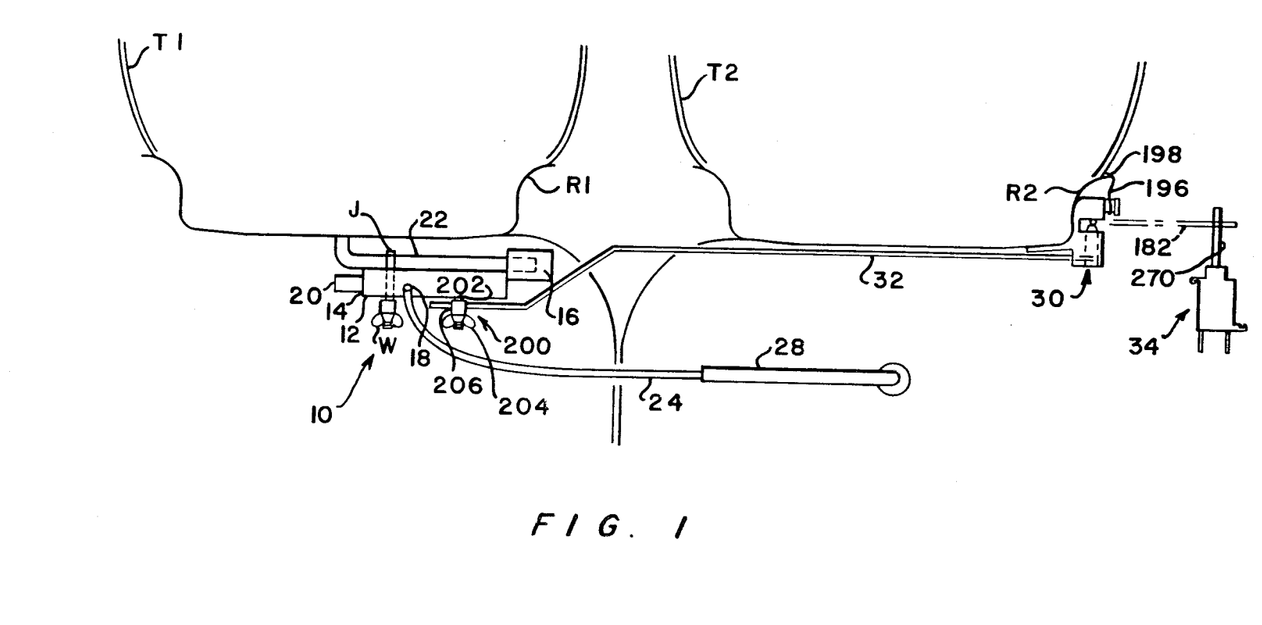
FIG. 1 is a diagrammatic representation of a pumping and deflation warning system for a pair of dual tires.

Referring firstly to FIG. 1, the system illustrated comprises a device 10 having a body 12 provided with an air inlet 14 and air outlets at 16 and 18. Reference numeral 20 designates a removable dust cap which covers the inlet 14 and reference numeral 22 designates the valve stem of the outer tire T1 of pair of dual tires. The valve stem 22 enters the outlet 16.

A flexible pipe 24 connects the outlet 18 to the valve stem 28 of the inner tire T2 of the pair of dual tires.

A trigger unit 30 is connected to the device 10 by way of a stiff wire 32. For example, a 2 mm stainless steel wire can be used. The trigger unit 30 is mounted, as will be described in more detail hereinafter, on the rim carrying the inner tire T2 of the pair.

The final component shown in FIG. 1 is a switch 34 which is mounted by means of its lugs 36 on a fixed part of the vehicle i.e. on the chassis, on a non-rotating part of the axle such as the brake drum, or on the U-bolts which secure the leaf springs in place.

Figure 2:
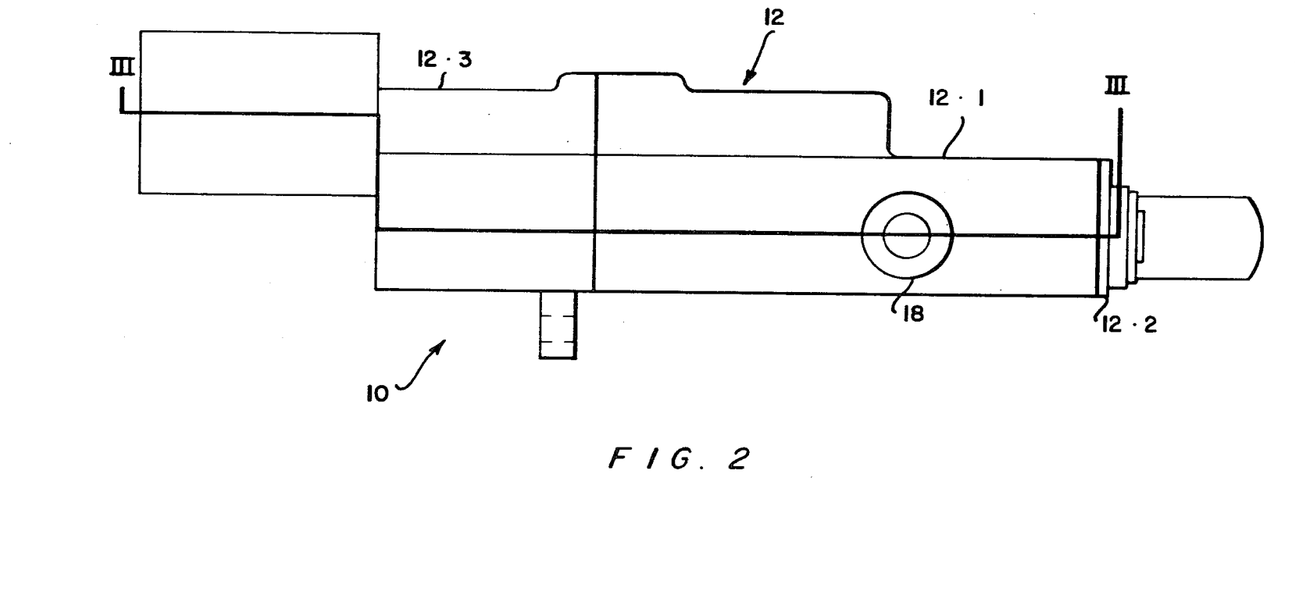
FIG. 2 is a side elevation of a device forming part of the system of FIG. 1.
Figure 3:
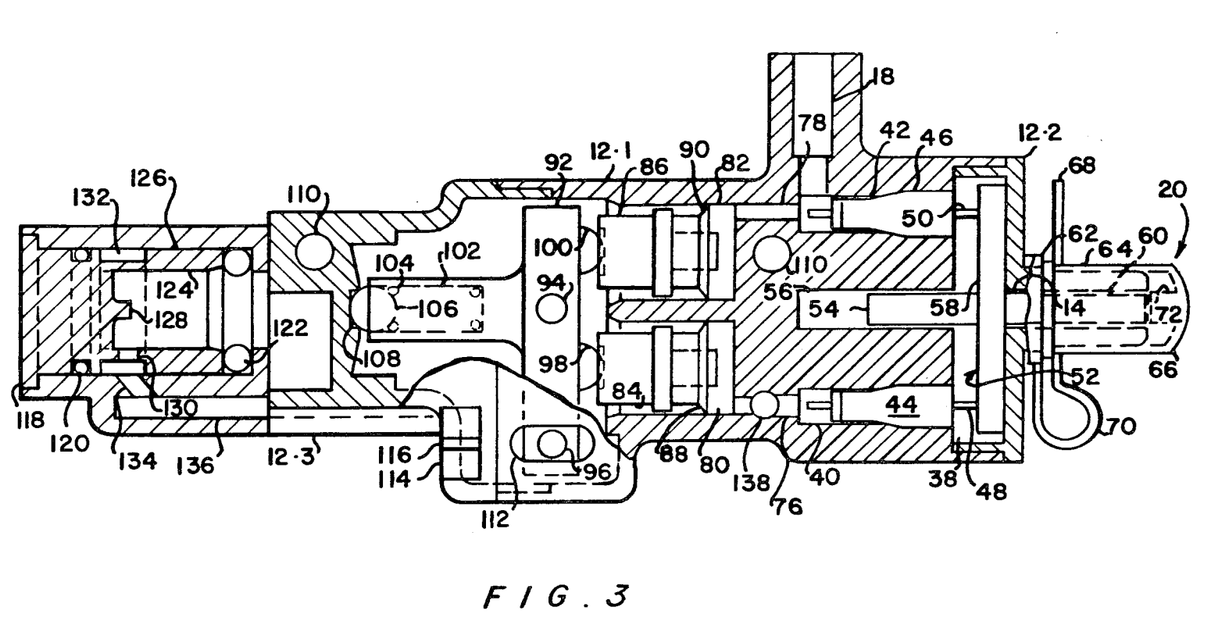
FIG. 3 is a section on the line III—III of FIG. 2.

Turning now to FIGS. 2 and 3, the body 12 comprises a central section 12.1 and two end sections 12.2 and 12.3. The end sections 12.2 and 12.3 snap onto the central section 12.1 after the internal components have been placed in position.

The inlet 14 is in the section 12.2 and communicates with a chamber 38, the chamber 38 being in communication with two passages 40 and 42. These passages are tapped and one way valves 44 and 46 are screwed into these passages. The valves can be of the Schrader type. The operating pins of the valves 44 and 46 are shown at 48 and 50 respectively.

Located in the inlet 14 and chamber 38 is an element 52 which is guided by means of a stem 54 which slides in a bore 56 of the body section 12.2. The element 52 further includes a transverse portion 58, the ends of this portion co-operating with the pins 48 and 50, and a rod 60 which extends to the outer end of the inlet 14.

The cap 20 comprises a collar 62 which fits tightly around the boss through which the inlet 14 passes, a sleeve 64, a dome-like transverse end wall 66, a tab 68 protruding from the sleeve 64, and a strip 70 connecting the sleeve 64 to the collar 62. The tab 68 and strip 70 are diametrically opposed. A boss 72 protrudes from the inner face of the end wall 66 and co-operates with the end of the rod 60.

Passages 76 and 78 connect the passages 40 and 42 to cylinders 80 and 82. Pistons 84 and 86, encircled by U-packings 88 and 90, slide in the cylinders 80 and 82. The pistons are shaped as illustrated to provide two circular contact zones between each piston and the pistons have a protruding ring as illustrated to provide a circular contact zone between each piston and the wall of the cylinder in which it slides. This is in addition to the circular line of contact between the sealing ring and the bore wall and inhibits tilting of the piston.

A T-shaped lever 92 is pivotally mounted in the body 12 by means of its two opposed, projecting pins 94 and has a hole 96 therein. Semi-spherical bosses 98 and 100 of the cross bar of the lever 92 bear on the pistons 84 and 86. The pistons are as shown provided with recesses which receive the bosses 98 and 100.

The upright of the lever 92 has a blind bore 102 therein and a coil spring 104 is contained within the blind bore. A ball 106 seats partly in the blind bore 102 and partly in a recess 108 of the section 12.3.

Two cross bores 110 are provided in the body 12 to enable J-bolts to be passed through the body The bore 110 which has the J-bolt passed through it, is chosen in dependance on the nature of the valve stem 22. The curved end of the J-bolt (designated J in FIG. 1) is hooked around the valve stem 22. Tightening of a wing nut W causes the J-bolt to pull the body 12 against the valve stem and prevents it coming loose.

The central section 12.1 of the body 12 has an opening 112 therein through which access can be had to the hole 96. Adjacent the opening 112 there is a block 114 with a groove 116 extending transversely across the block. The groove 116 is keyhole shaped having a narrow entrance and a wider interior.

The air outlet 16 is in the form of a bore which passes through that portion of the end section 12.3 which is offset with respect to the remainder (see FIG. 2). A plug 118 is pushed into the bore from the right hand end as viewed in FIG. 1 and from the left hand end as viewed in FIG. 3. An O-ring 120 is fitted to the plug 118 before the plug is pushed into the bore, and an O-ring 122 is pushed in ahead of the plug 118. The plug 118 itself has a blind bore 124 therein which is bounded by a sleeve 126. A central projection 128 protruding into the blind bore from the closed end thereof engages the core of the Schrader valve of the valve stem 22 and opens it. The stem 22 is not shown in FIGS. 2 and 3. The O-ring 120 seals between the end section 12.3 and the plug 118 and the O-ring 122 seals between the section 12.3 and the valve stem 22.

A hole 130 in the sleeve 126 leads from the blind bore 124 of the plug 118 into an annular recess 132 formed in the outer face of the sleeve 126. The recess 132 is connected by a passage 134 to an airway 136 which in turn communicates via a bore 138 with the passage 76. There is an O-ring (not shown) where the airway passes from the section 12.3 to the section 12.2.

Figure 4:
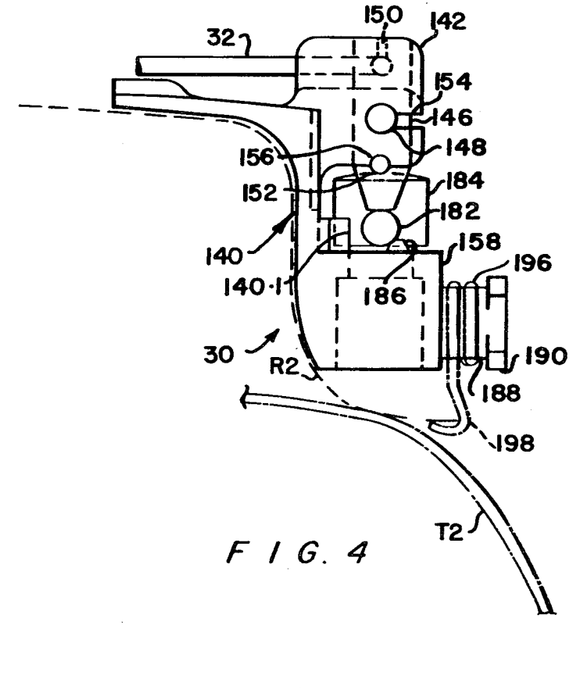
FIG. 4 is a side elevation of a trigger unit.
Figure 5:
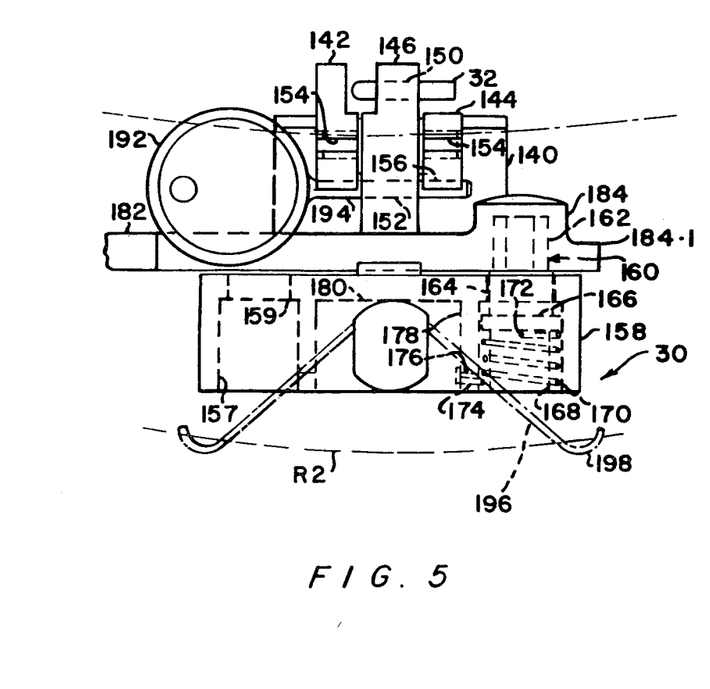
FIG. 5 is a front elevation of the trigger unit of FIG. 4.

Turning now to FIGS. 4 and 5, the trigger unit 30 illustrated comprises a curved plate 140 from which two lugs 142, 144 protrude. A lever 146 is mounted on the lugs 142, 144 by means of two pins 148 which protrude in opposite directions. In the part of the lever 146 above the pins 148 there is a keyhole slot 150 and in the part of the lever below the pins 148 there is an opening 152. The tip of the lever 146 is radiussed.

The lugs 142 and 144 each have a keyhole slot 154 in the side thereof and a groove 156 in the lower edge thereof.

The lever 146 is mounted on the lugs 142, 144 by pressing the pins 148 into the open ends of the keyhole slots 154. The slots 154 open out as the pins move into them and then return to their initial condition as the pins reach the wider inner ends of the slots.

The plate 140 further includes a block-like portion designated 158 and in this portion there are two through bores 157. Each bore is stepped to provide a shoulder at 159.

Within one of the bores 157 there is a capstan 160. The capstan includes an hexagonal head 162, a cylindrical portion 164, a ring portion 166 of greater diameter than the remainder of the capstan, and a lower portion 168 which is split into two semi-cylindrical halves by means of a diametral slot.

The capstan 160 is pushed into the through bore 157 from below until the ring portion 166 is slightly spaced from the shoulder 159. At this stage the portion 164 is in the narrower part of the through bore 157 and the head 162 is above the block-like part 158. It will be noted that there is an annular space between the lower portion 168 and the larger diameter portion of the bore 157. A coil spring 170 is contained in this annular space.

The coil spring 170 is wound so as to provide a transverse connecting portion 172 at its upper end and a tail 174 at its lower end. The portion 172 extends through the diametral slot in the lower portion 168 of the capstan 160 and the tail 174 is engaged in a slot 176 provided therefor in the wall 178 which divides the bore 157 from a cavity 180.

A switch operating arm 182 is provided and includes a socket 184 which receives the head 162 of the capstan 160. The remainder of the arm 182, as will be seen from FIG. 4, is of circular cross section.

Before the arm 182 is attached to the capstan 160, a screwdriver is inserted into the diametral slot of the portion 168 and the capstan turned through, say, one quarter of a turn. Without allowing the spring to relax, the arm 182 is attached. When the arm 182 is swung to the position shown in FIGS. 4 and 5, the spring 170 is further tensioned. The effect of this is that, even after the arm has swung to its operative position, as will be described, the spring 170 is still tensioned.

A stop 184.1 on the arm 182 and one or other of two stops 140.1 (only one of which is visible) on the plate 140 limit movement of the arm 182.

The block-like portion 158 is formed with a raised stop 186 (see particularly FIG. 4) and is also provided with a boss 188 having an enlarged head 190.

A pin 192 is shown in FIG. 5, the pin 192 having its shank 194 passed through the opening 152 and semi-circular grooves 156.

The bore 157 which is used depends on whether a nearside or offside pair of wheels is involved.

Figure 6:
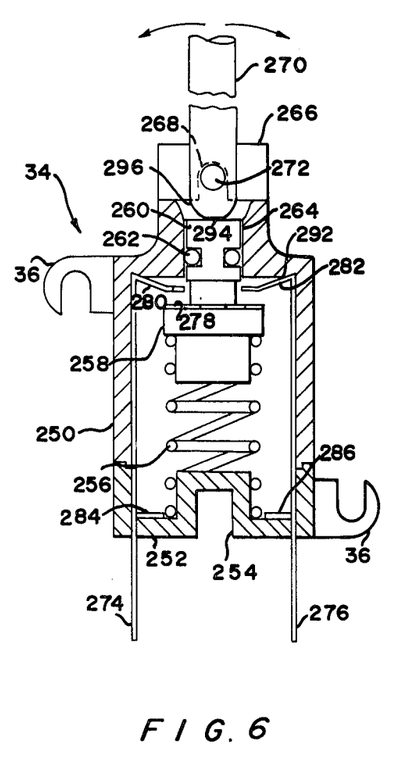
FIG. 6 is a section through a switch.

Turning finally to FIG. 6, the switch 34 illustrated comprises a generally cylindrical body 250 and an end cap 252. The end cap 252 is formed with a boss 254 which forms a seating for a spring 256. The spring 256 acts between the end cap 252 and the movable structure 258 of the switch. The structure 258, which comprises two parts snapped together, includes a cylindrical guide 260 which is encircled by an O-ring 262 and which slides in a bore 264 of the body 250.

The body 250 is extended by two spaced apart walls 266 each of which has a recess 268 therein. A switch operating member 270 is provided, this being formed with laterally projecting pins 272 which are received in the recesses 268.

Spade terminals are shown at 274 and 276 and an electrically conducting washer 278 is carried by the structure 258. It will be seen that the spade terminals 274 and 276 extend through slots in the end cap 252, axially along the inner face of the body 250 and then turn inwardly to provide portions 280 and 282 which overlie the washer 278. Punched tabs 284 and 286 seating in shallow recesses of the cap 252 facilitate location of the spade terminals 274, 276 during assembly.

The switch illustrated in FIG. 6 is assembled by inverting the body 250 from the position illustrated and pushing the member 270 through the body 250 from the open upper end thereof. The pins 272 engage in the recesses 268 which limit further movement of the member 270. The member 270 is then swung through 90° from the position shown. Thereafter the washer 278 is mounted on the assembled structure 258, the O-ring 262 is positioned in its groove and the spring 256 is attached both to the structure 258 and to the boss 254 of the cap 252. The spade terminals 274, 276 are pushed through their slots in the end cap. Thereafter this sub-assembly is pushed into the body 250 until the cylindrical guide 260 abuts the member 270. At this stage the spring 256 holds the washer 278 against the portions 280 and 282. Once the end cap 252 has been snapped into position, the member 270 is returned to the position shown. The end of the member 270 has a central, flat surface 294 and two radiussed surfaces 296. As the member 270 is swung through 90°, one of the radiussed surfaces cams the structure 258 towards the cap 252 to separate the portions 280, 282 from the washer 278.

The member 270 can, if desired, have an hexagonal end onto which a straight or right angled extension piece (not shown) can be fitted. This ensures that wherever the switch 34 is fitted on the vehicle the member 270 can be extended into the path of travel of the triggered arm 182.

The spade terminals 274 and 276 are received in recesses 292 of the body 250 to prevent shifting of them in use.

The various components of the system are secured in place in the following manner. The device 10 is placed over the valve stem 22 of the outer tire so that the tip of the valve stem 22 enters the bore which constitutes the air outlet 16. As the device 10 is pulled onto the stem, the O-ring 122 contacts and seals around the valve stem 22 and the projection 128 opens the Schrader valve of the valve stem 22. A J-bolt is then inserted through the appropriate bore 110 and the wing nut tightened.

The unit 30, by virtue of the shape of the plate 140, is compatible with the tire carrying rim. The position occupied by the rim R2 has been shown in chain-dotted lines in FIGS. 4 and 5. A torsion spring 196 has the central loops thereof around the boss 188 and the bent over tips of the arms 198 thereof hooked over the rim R2 between the rim and the tire T2. This spring serves to hold the unit 30 in place.

The stiff wire 32 has one end thereof bent through a right angle and this is pressed down into the keyhole slot 150 of the lever 146. The lug 142 traps the wire 32 between itself and the lever 146 and prevents sideways movement.

The wire 32 extends from the rim R2 of the inner wheel, across the gap between the inner and outer wheels, and into close proximity with the device 10 as shown in FIG. 1. The wire is pressed into the groove 116 (FIG. 3) and extends across the opening 112.

Reference numeral 200 in FIG. 1 denotes the structure provided for attaching the wire 32 to the lever 92. This structure 200 comprises a cylindrical element one end portion of which is turned down to form a pin 202 and the other end portion of which is threaded to receive a wing nut 204. The cylindrical central portion of the element has a transverse bore therein and is within a sleeve 206 which has diametrically opposed bores which can be aligned with the bore in the element. When the wingnut 204 is tightened it bears on the sleeve so that the sleeve 206 and the element are displaced axially with respect to one another.

The end of the wire 32 is pushed through the aligned bores and the structure 200 is adjusted along the wire 32 until it lies over the hole 96. The pin 202 of the structure 200 enters the hole 96 and the wingnut 204 is then tightened to crimp the wire 32. Any part of the wire 32 which protrudes beyond the structure 200 can then cut off if desired.

The pin 192 is only needed to ensure that the lever 146 is vertical when fitting takes place. Immediately thereafter it is withdrawn and discarded.

A barbed insert attached to the pipe 24 is pushed into the outlet 18, the barbs preventing withdrawal. The other end of the pipe 24 has an internally threaded collar thereon which is screwed onto the valve stem 28 of the tire T2.

When the system is fitted as described, the cylinders 80 and 82 are at the same pressures as the tires of the pair of dual tires. On the assumption that the tires are at the same pressure, then the forces exerted by the pistons 84, 86 on the lever 92 are the same. The lever 92 is thus in the position shown in FIG. 3 and the wire 32 is as shown in FIGS. 4 and 5. The lever 146 thus remains in the upright position illustrated and prevents the arm 182 from moving over the stop 186.

If it is now assumed that the outer tire T1 is steadily dropping in pressure, then the force exerted by the piston 84 on the lever 92 steadily decreases. The force exerted by the piston 86 remains substantially constant. There is thus a tendancy for the lever 92 to pivot about the axis constituted by its pins 94. However, the ball 106 resists the initial tendency of the lever 94 to pivot. As the out-of-balance force increases, the ball 106 tends to ride up the right hand edge of the recess 108 and in so doing the spring 104 is compressed. The force exerted by this spring is chosen so that the pressure in the outer tire must fall by a predetermined pressure with respect to the pressure in the inner tire before the spring will compress sufficiently to enable the ball to clear the edge of the recess 108.

Upon the ball 106 lifting out of the recess 108, and sliding down the particular ramp which is on that side of the recess, the lever 92 tilts and thus a pull or a push is exerted on the wire 32.

Motion of the wire 32 causes the lever 146 to be pivoted about the pins 148. Regardless of whether the lever 146 swings clockwise or anti-clockwise in FIG. 4, the effect is to increase the gap between the lever 146 and the stop 186. Upon this gap opening, the arm 182 under the influence of the spring 170 swings outwardly to a position at right angles to that illustrated. The arm 182 now lies in a position in which it can strike the member 270 of the switch 34. As the spring 170 is still under tension, the stop 184.1 is held against one of the stops 140.1.

When the arm 182 strikes the member 270 it urges it in a pivotal movement about the common axis of the pins 272 as indicated by the curved arrows at the top of FIG. 6. The direction of movement of the arm 270 depends on whether the vehicle is moving forward, the most usual condition, or whether it happens to be moving in reverse at the moment that the arm 182 is freed.

The distance from the common axis of the pins 272 to the surface 294 is greater than the radial distance from said axis to the surfaces 296. Thus, as the member 270 rotates, the guide 260 acts in the way of a cam follower under the influence of the spring 256 and the entire structure 258 moves. The spring 256 is thus effective to cause the rolling motion between the guide 260 and the member 270 to continue until the member 270 has turned through 90° and lies out of the path of the arm 182. Thus, even though the vehicle continues to move, there is no prospect of the arm 270 being struck continually.

Movement of the structure 258 under the action of the spring 256 results in the washer 278 bridging across the spade terminals 274, 276. The spade terminals 274, 276 can be connected in circuit with a visual or audible warning device located in the cab of the vehicle so that the driver immediately becomes aware that one of his tires is running at below pressure.

The first time that a low pressure warning signal is received in respect of a particular pair of tires, the driver can equalize the pressures in the tires of the pair by pressing in on the cap 20 which has the effect of displacing the element 58 and opening the valves 44 and 46. Thus if one tire is at full pressure and the other is 68 Kpa (10 psi) low, both tires will thereafter be only 34 Kpa (5 psi) low and can be run for sufficiently long without significant damage to reach a service station. Of course, subsequent depression of the cap 20 will result in both tires being at below acceptable pressures. This facility makes it unnecessary for a tire to be changed on the road if it is only deflating slowly. As the cap 20 remains in place, pressure equalization is achieved without loss of air.

Should it be necessary to change the outer wheel of the pair of dual wheels, it is merely necessary to loosen the wing nut W on the J-bolt J, lift the pin 202 of the structure 200 fixed to the wire 32 out of the hole 96, and disconnect the pipe 24 from the valve stem 28. The device 10 can then be taken off the stem 22. Once the wheel has been changed, the reverse procedure is followed.

If it is necessary to change the inner wheel, the unit 30 must also be disconnected. This is achieved by pressing the arms 198 of the torsion spring 196 towards one another so that the hooks at the ends of the arms disconnect from the rim R2. The wire 32 is not detached from the lever 146.

A visual inspection of the device 10 will indicate whether the structure 200 has moved. Movement of the structure 200 reveals one or other end of the opening 112. If the lever 92 is of a bright colour, then this is readily visible through the opening 112 if the structure 200 has moved.

It will be understood from the above that no mechanical changes must be made to the tires or rims of the pair of dual tires to enable the system described to be fitted.

Furthermore, the only tool that is needed in initial fitting is a pair of wire cutters to cut-off the excess length of the wire 32, and even this is not essential as a piece of wire extending beyond the opening 112 is not detrimental to the operation of the device. No tools are needed for subsequent removal and re-fitting.

To pump the tires, the cap 20 is flicked back by means of the tab 68 and an airline applied. The rod 60 opens the valve of the airline and simultaneously the element 52 is displaced to open the valves 44 and 46. The two tires are now in communication with one another and with the airline so that it is possible to pump them to the same pressure.

I claim:

1. A pumping and tire deflation warning system for a pair of dual wheels, the system comprising a device mounted on the wheels, the device including a body having an inlet for connection to an air line and two outlets respectively connected to the tires of the pair of wheels, an element within the body and subjected to a first force which is derived from the pressure in one tire and a second force which opposes the first force and which is derived from the pressure in the other tire, the element being moved by either one of said forces when that force exceeds the other by a predetermined amount, a trigger unit mounted on the rim of the inner wheel, the trigger unit including an arm which is normally held in an inoperative position, a mechanical link between said element and said trigger unit for releasing said arm to its operative position when said element moves upon the tire pressures, and hence said forces, varying from one another by a predetermined amount, and switch means mounted on a fixed part of the vehicle and having an operating member positioned to be hit by said arm when it is in its operative position.

2. A system according to claim 1, in which said device comprises a pair of cylinders with a piston in each cylinder, each cylinder being connected to one of said tires, and a pivotally mounted lever constituting said element, said pistons bearing on said lever on opposite sides of its pivotal mounting.

3. A system according to claim 2, and including a spring loaded latching mechanism for preventing motion of said lever about its pivotal mounting until the pressures vary from one another by a predetermined amount.

4. A system according to claim 3, in which said lever and said body each have a recess therein, there being a spring in one of the recesses and a latch element part of which is in each recess, the spring acting on the latch element and urging it into the other recess.

5. A system according to claim 4 in which said lever is of T shape and is pivotally mounted where the cross bar and upright of the 'T' intersect, said pistons bearing on the cross bar on the side thereof remote from said upright, and said recess of the lever being a bore in the end of the upright remote from the cross bar.

6. A system according to claim 1, in which said device further comprises a first one way valve between said inlet and one of said outlets and a second one way valve between said inlet and the other of said outlets and means for enabling said valves to be opened simultaneously thereby to place said outlets in communication with one another.

7. A system according to claim 6, in which said means for enabling said valves to be opened comprises an element protruding into said inlet from inside the body.

8. A system according to claim 7 and including a resilient, removable cap for covering said inlet, said cap being deformable whereby, upon pressure being applied thereto, said element can be displaced to open said valves.

9. A system according to claim 1, in which said trigger unit comprises a pivotally mounted lever to which said link is connected, said arm itself being mounted for swinging movement about an axis, being spring loaded in the direction which causes it to swing about said axis towards its operative position, and being held in place by said lever until the link and the lever are displaced upon movement of the element whereupon said spring urges the arm about its pivotal axis to its operative position.

10. A system according to claim 9, in which said trigger unit comprises a body having a raised stop thereon, and said lever has a radiussed end, the gap between said radiussed end and the stop being less than the diameter of said arm whereby the arm can only move between the stop and the lever upon said link displacing the lever.

* * * * *